US008646989B2

(12) United States Patent
Zimmel et al.

(10) Patent No.: US 8,646,989 B2
(45) Date of Patent: Feb. 11, 2014

(54) MECHANICAL INTERFACE BETWEEN A FIBER OPTIC CABLE AND A FIBER OPTIC CONNECTOR

(75) Inventors: Steven C. Zimmel, Minneapolis, MN (US); Yu Lu, Eden Prairie, MN (US); Patrick Nault, Carver, MN (US); Scott C. Kowalczyk, Savage, MN (US); Scott Droege, Burnsville, MN (US); Brent Campbell, Minneapolis, MN (US); Christopher Stroth, Lakeville, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 564 days.

(21) Appl. No.: 12/782,929

(22) Filed: May 19, 2010

(65) Prior Publication Data
US 2010/0322568 A1  Dec. 23, 2010

Related U.S. Application Data

(60) Provisional application No. 61/179,673, filed on May 19, 2009.

(51) Int. Cl.
*G02B 6/36* (2006.01)
(52) U.S. Cl.
USPC .......................................................... 385/81
(58) Field of Classification Search
USPC .......................................................... 385/81
See application file for complete search history.

(56) References Cited

U.S. PATENT DOCUMENTS

| 4,611,887 A | | 9/1986 | Glover et al. |
| 4,647,717 A | * | 3/1987 | Uken .......................... 174/84 C |
| 4,964,685 A | | 10/1990 | Savitsky et al. |
| 5,096,276 A | | 3/1992 | Gerace et al. |
| 5,142,602 A | * | 8/1992 | Cabato et al. ................... 385/87 |
| 5,214,730 A | | 5/1993 | Nagasawa et al. |

(Continued)

OTHER PUBLICATIONS

International Search Report and Written Opinion mailed Dec. 29, 2010.

*Primary Examiner* — Eric Wong
(74) *Attorney, Agent, or Firm* — Merchant & Gould P.C.

(57) ABSTRACT

A fiber optic connector and cable assembly is disclosed herein. The fiber optic connector and cable assembly includes a cable having at least one optical fiber, a jacket surrounding the optical fiber and at least one strength member for reinforcing the fiber optic cable. The fiber optic connector and cable assembly also includes a fiber optic connector having a main connector body having a distal end and a proximal end. The fiber optic connector also includes a ferrule supporting an end portion of the optical fiber. The ferrule is mounted at the distal end of the main connector body. The fiber optic connector further includes a spring for biasing the ferrule in a distal direction and a spring push for retaining the spring within the main connector body. The spring push is mounted at the proximal end of the main connector body. The spring push includes a main body and a stub that projects proximally outwardly from the main body. A crimp band is provided for securing the fiber optic cable to the fiber optic connector. The crimp band includes a first portion crimped down on the stub. The strength member is secured between the first portion of the crimp band and the stub. The crimp band also includes a second portion crimped down on the jacket of the fiber optic cable. The crimp band further includes an inner surface having gripping structures for gripping the strength member and/or the jacket.

28 Claims, 9 Drawing Sheets

(56) References Cited

U.S. PATENT DOCUMENTS

| | | | | |
|---|---|---|---|---|
| 5,214,731 | A | 5/1993 | Chang et al. | |
| 5,418,874 | A * | 5/1995 | Carlisle et al. | 385/76 |
| 5,943,460 | A * | 8/1999 | Mead et al. | 385/81 |
| 6,499,887 | B2 | 12/2002 | Dean, Jr. et al. | |
| 6,648,520 | B2 | 11/2003 | McDonald et al. | |
| 6,738,555 | B1 | 5/2004 | Cooke et al. | |
| 6,816,661 | B1 | 11/2004 | Barnes et al. | |
| 7,079,734 | B2 | 7/2006 | Seddon et al. | |
| 7,090,406 | B2 | 8/2006 | Melton et al. | |
| 7,104,702 | B2 | 9/2006 | Barnes et al. | |
| 7,137,742 | B2 | 11/2006 | Theuerkorn et al. | |
| 7,146,090 | B2 | 12/2006 | Vo et al. | |
| 7,150,567 | B1 | 12/2006 | Luther et al. | |
| 7,192,195 | B2 | 3/2007 | Turner | |
| 7,204,644 | B2 | 4/2007 | Barnes et al. | |
| 7,270,487 | B2 | 9/2007 | Billman et al. | |
| 7,331,719 | B2 * | 2/2008 | Manning et al. | 385/81 |
| 7,572,065 | B2 | 8/2009 | Lu et al. | |
| 7,594,764 | B2 | 9/2009 | Palmer et al. | |
| 7,628,545 | B2 | 12/2009 | Cody et al. | |
| 7,744,288 | B2 | 6/2010 | Lu et al. | |
| 7,785,019 | B2 | 8/2010 | Lewallen et al. | |
| 2002/0164130 | A1 | 11/2002 | Elkins, II et al. | |
| 2005/0238292 | A1 | 10/2005 | Barnes et al. | |
| 2006/0263011 | A1 * | 11/2006 | Chen et al. | 385/75 |
| 2009/0035993 | A1 * | 2/2009 | Okayasu | 439/610 |
| 2010/0034502 | A1 | 2/2010 | Lu et al. | |
| 2010/0054680 | A1 | 3/2010 | Lochkovic et al. | |
| 2010/0080511 | A1 | 4/2010 | Luther et al. | |

\* cited by examiner

MECHANICAL INTERFACE BETWEEN A FIBER OPTIC CABLE AND A FIBER OPTIC CONNECTOR

CROSS-REFERENCE TO RELATED APPLICATION

This application claims the benefit of U.S. Provisional Patent Application Ser. No. 61/179,673, filed May 19, 2009, which application is hereby incorporated by reference in its entirety.

TECHNICAL FIELD

The present disclosure relates to fiber optic data transmission, and more particularly to fiber optic cable connection systems.

BACKGROUND

Fiber optic cables are widely used to transmit light signals for high speed data transmission. The fiber optic cables include an optical fiber or optical fibers. The optical fibers function to carry the light signals (i.e., optical signals). A typical optical fiber includes an inner core surrounded by a cladding that is covered by a coating.

Fiber optic cable connection systems are used to facilitate connecting and disconnecting the fiber optic cables in the field without requiring a splice. A typical fiber optic cable connection system for interconnecting two fiber optic cables includes fiber optic connectors (i.e., optical fiber connectors) mounted at ends of the fiber optic cables, and an adapter for mechanically and optically coupling the fiber optic connectors together. The fiber optic connectors generally include ferrules that support ends of the optical fibers of the fiber optic cables. End faces of the ferrules are typically polished and are often angled. The adapter includes co-axially aligned ports (i.e., receptacles) for receiving the fiber optic connectors desired to be interconnected. The adapter generally includes an internal sleeve that receives and aligns the ferrules of the fiber optic connectors when the connectors are inserted within the ports of the adapter. With the ferrules and their associated fibers aligned and abutted within the sleeve of the adapter, a fiber optic signal can pass from one fiber to the next corresponding fiber via an optical interface created by this arrangement. The adapter also typically has a mechanical fastening arrangement (e.g., a snap-fit arrangement, a latch, etc.) for mechanically retaining the fiber optic connectors within the adapter.

Fiber optic cables are currently being routed to customer premises (e.g., fiber-to-the premises). During installation of fiber optic cable in buildings, pulling eyes attached to fiber optic connectors are used to pull fiber optic cables through conduits within the building. The use of pulling eyes attached to fiber optic connectors to pull fiber optic cables through conduits places tension on the mechanical interfaces between the fiber optic connectors and their corresponding fiber optic cables. This can cause the mechanical interfaces to fail under the tension loading. Additionally, during installation of connectorized fiber optic cables, side loads/bending moments can be applied to the fiber optic connectors thereby causing breakage.

SUMMARY

One aspect of the present disclosure relates to a mechanical interface between a fiber optic connector and a fiber optic cable that can withstand relatively high tension loading without failing. In one embodiment, the mechanical interface can withstand at least 75 pounds of tensile loading.

Another aspect of the present disclosure relates to a fiber optic connector having a front end with a ferrule and a rear end adapted to be mechanically coupled to a fiber optic cable. The rear end of the fiber optic connector is configured to resist breakage caused by side loadings/bending moments applied to the fiber optic connector.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 1:
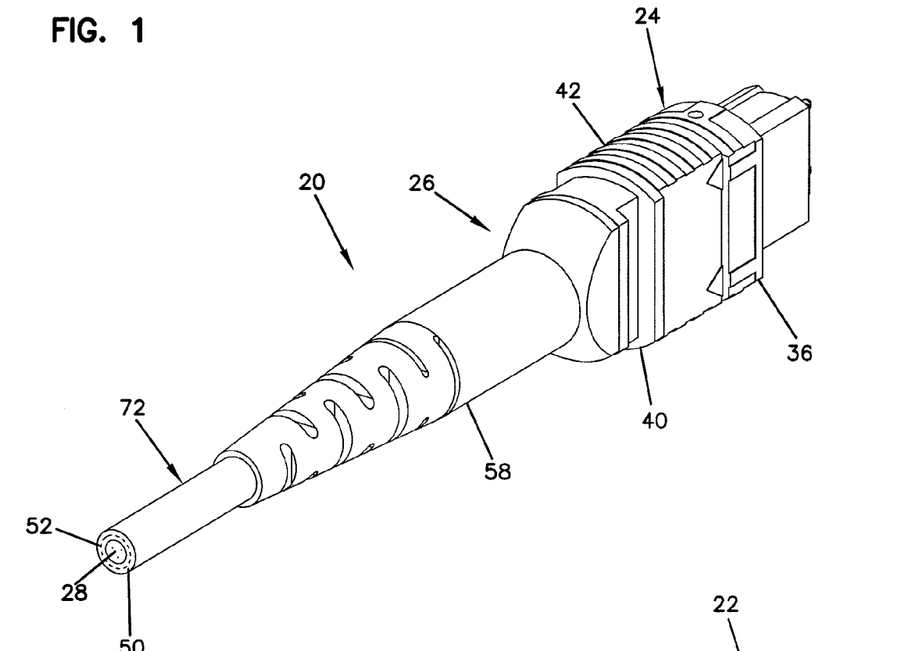
FIG. 1 is a perspective view of a fiber optic cable and connector assembly in accordance with the principles of the present disclosure, the perspective view showing a proximal end of the fiber optic cable and connector assembly.
Figure 2:
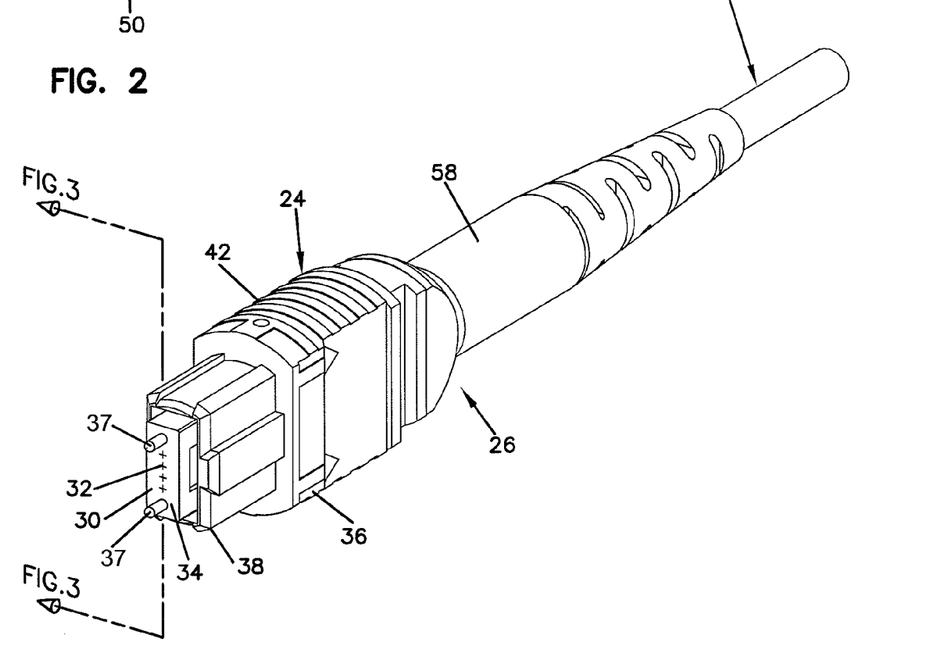
FIG. 2 is another perspective view of the fiber optic cable and connector assembly of FIG. 1, the perspective view showing a distal end of the fiber optic cable and connector assembly.

FIGS. 1 and 2 show a fiber optic cable and connector assembly 20 in accordance with the principles of the present disclosure. The fiber optic connector and cable assembly 20 includes fiber optic cable 22 mechanically connected to a fiber optic connector 24 at a mechanical interface 26. The fiber optic cable 22 includes a plurality of optical fibers 28 (e.g., 12 fibers, 24 fibers, or any other number of fibers) having end portions that terminate at a ferrule 30 of the fiber optic connector 24. The end portions of the optical fibers 28 are typically secured (e.g. with epoxy) within openings defined by the ferrule 30 and have polished ends 32 (shown schematically at FIG. 2) located at an end face 34 of the ferrule 30. The ferrule 30 can include alignment structures (e.g., pins 37, pin receivers, or other structures) for aligning the ferrules of two connectors desired to be connected together. When two fiber optic connectors are connected together, the polished ends 32 of their respective optical fibers 28 are preferably placed in co-axial alignment with one another such that optical transmissions can readily be transferred from fiber to fiber.

Figures 3, 4:
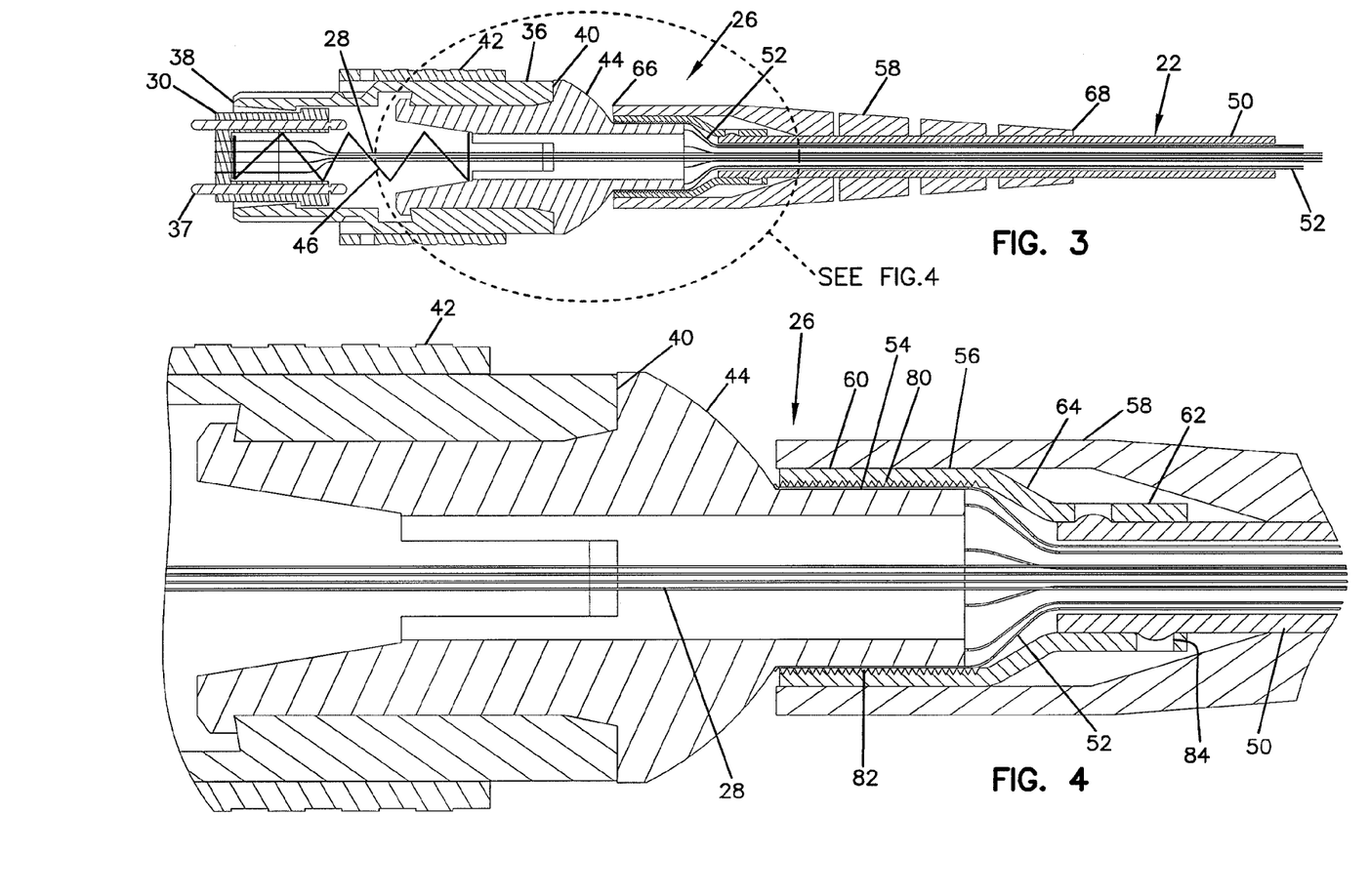
FIG. 3 is a cross-sectional view of the fiber optic cable and connector assembly of FIG. 1, the cross-sectional view taken at a plane illustrated at FIG. 2.
FIG. 4 is an enlarged portion of FIG. 3.

Referring to FIGS. 3 and 4, the fiber optic connector 24 includes a main connector body 36 having a distal end 38 positioned opposite from a proximal end 40. A release sleeve 42 is slidably mounted about the main connector body 36 at a location between the distal end 38 and the proximal end 40. The release sleeve 42 can be slidably retracted on the main connector body 36 to disengage the fiber optic connector 24 from a fiber optic adapter. The ferrule 30 mounts at the distal end 38 of the main connector body 36 and a spring push 44 mounts at the proximal end 40 of the main connector body 36. The spring push 44 engages a spring 46 (shown only at FIG. 3 for clarity) positioned within the main connector body 36 that biases the ferrule 30 in a distal direction. The spring push 44 is secured to the main connector body 36 by a mechanical connection such as a snap-fit connection.

Referring back to FIG. 1, the optical fibers 28 of the fiber optic cable 22 are contained within an outer jacket 50. The fiber optic cable 22 also includes strength members 52 positioned inside the outer jacket 50 and around the optical fibers 28. In one embodiment, the strength members 52 are configured to provide the fiber optic cable 22 with tensile strength without substantially decreasing the flexibility of the fiber optic cable 22. By way of example, the strength members 52 can include the plurality of flexible members such as aramid yarns (i.e., Kevlar).

The mechanical interface 26 includes a crimp supporting stub 54 (i.e., a barrel) that projects proximally outwardly from a main body of the spring push 44, a crimp band 56, and an outer boot 58. The crimp band 56 can be made of a deformable metal material. In one embodiment, the crimp band 56 includes a first portion 60 connected to a second portion 62 by a radial in-step 64. The first portion 60 is crimped over the crimp supporting stub 54 and has a larger transverse cross-dimension than the second portion 62. The first portion 60 of the crimp band 56 functions to secure the strength members 52 of the fiber optic cable 22 to the fiber optic connector 24. Specifically, the strength members 52 are mechanically crimped between the first portion 60 and the outer surface of the crimp supporting stub 54. The second portion 62 is crimped down on the outer jacket 50 of the fiber optic cable 22 to secure the outer jacket 50 to the fiber optic connector 24. The outer boot 58 includes a distal end 66 that mounts over the crimp band 56 and a proximal end that mounts over the fiber optic cable 22. The boot 58 can have a tapered configuration that transitions from a larger cross-dimension adjacent the distal end 66 to a smaller cross-dimension adjacent the proximal end 68.

After crimping, the crimp band 56 can have a number of different transverse cross-sectional shapes. In one embodiment, the crimp band 56 can have a polygonal shape (e.g., a hexagonal shape) after crimping. When the crimp band 56 is crimped over the crimp supporting stub 54, the crimp supporting stub 54 can deform to conform to/match the final shape of the crimp band 56. For example, the crimp supporting stub 54 can have a polygonal shape after crimping. In other embodiments, the crimp band 56 can include at least portions that are generally cylindrical after crimping.

It is desirable for the mechanical interface 26 to be able to withstand an axial tension load of at least 75 pound without failure (i.e., without the fiber optic connector 24 pulling away from the fiber optic cable 22). To improve the ability of the mechanical interface 26 to withstand high tensile loads, the first portion 60 of the crimp band 56 includes an inner surface 80 including strength member biting or gripping features 82 adapted for securely engaging the strength members 52 when the strength members 52 are crimped between the first portion 60 of the crimp band 56 and the crimp supporting stub 54. In certain embodiments, the gripping features 82 can include helical threads, teeth, knurling, projections, bumps or other structures. In certain embodiments, the gripping features 82 have an undulating configuration with relatively sharp peaks and valleys such as those formed by a thread pattern tapped or otherwise formed within the interior of the crimp band 56. In further embodiments, gripping features as described above can also be provided on the exterior surface of the crimp supporting stub 54. In such embodiments, the gripping features of the crimp band and the gripping features of the crimp supporting stub cooperate to secure the strength members between the crimp band and the crimp supporting stub.

To further enhance the ability of the mechanical interface 26 to withstand relatively large tensile loads, the second portion 62 of the crimp band 56 can be provided with gripping features 84 for gripping the outer jacket 50 of a fiber optic cable 22. As shown at FIG. 3, the gripping features 84 include through-holes defined radially through the second portion 62 of the crimp band 56. When the second portion 62 of the crimp band 56 is crimped down on the outer jacket 50, portions of the outer jacket 50 flow or otherwise deform into the through-holes 84 thereby providing a mechanical interlock that assists in maintaining engagement between the outer jacket 50 and the second portion 62 of the crimp band 56. In other embodiments, the gripping features on the second portion 62 may include ridges, bumps, dimples, depressions, teeth, or other structures.

Figure 5:
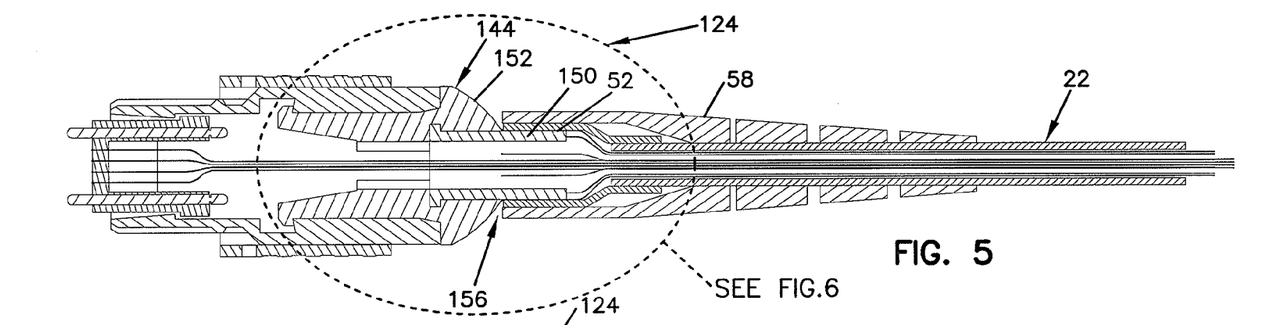
FIG. 5 is a cross-sectional view of another fiber optic cable and connector assembly in accordance with the principles of the present disclosure, the cross-sectional view taken through a pair of pins of the fiber optic cable and connector assembly.
Figure 6:
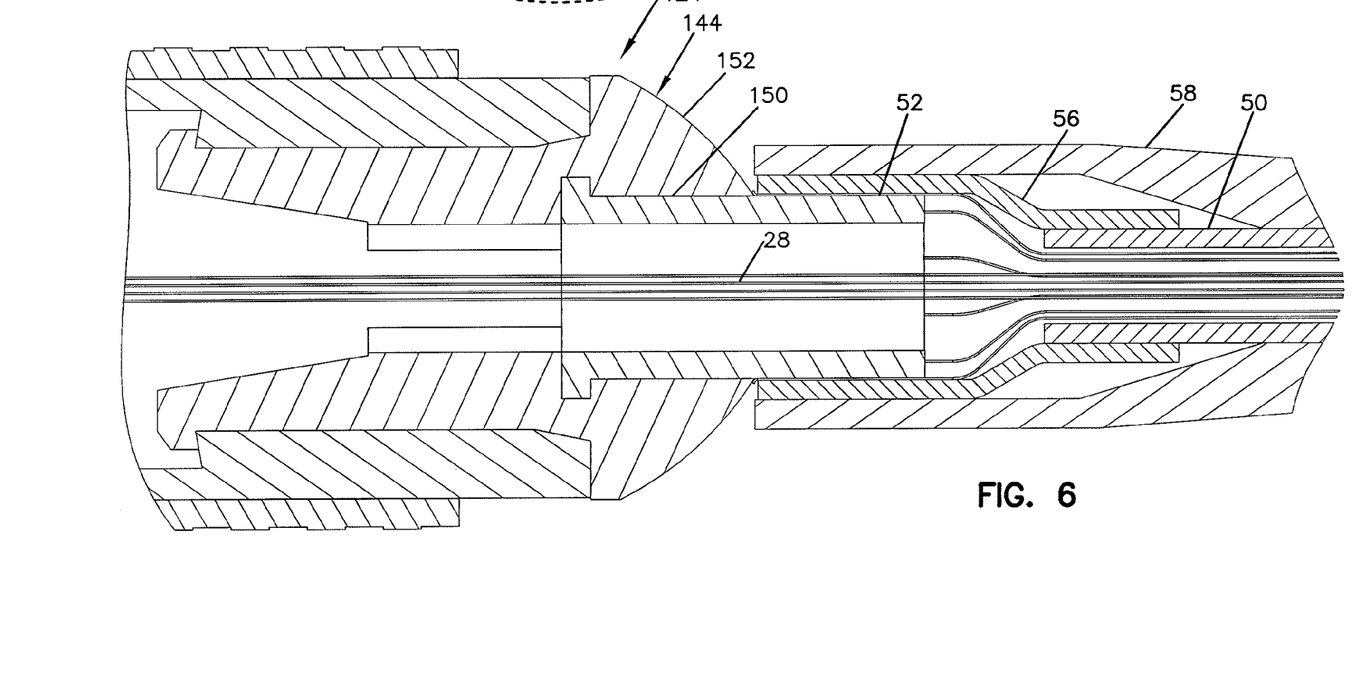
FIG. 6 is an enlarged portion of FIG. 5.

FIGS. 5 and 6 show an alternative fiber optic connector 124. The fiber optic connector 124 has the same components as the fiber optic connector 24 except for the configuration of the spring push. Specifically, the spring push 44 of the fiber optic connector 24 has a solid, homogeneous molded plastic construction. In contrast, the spring push 144 has a composite structure including a metal insert piece 150 embedded within an over-molded plastic piece 152. The metal insert piece 150 forms the crimp supporting stub of the spring push 144. Additionally, the insert piece 150 extends across a region 156 of the spring push 144 thereby providing the region 156 with structural reinforcement. In this way, region 156 is better able to withstand bending loads without breaking.

Figures 7, 8:
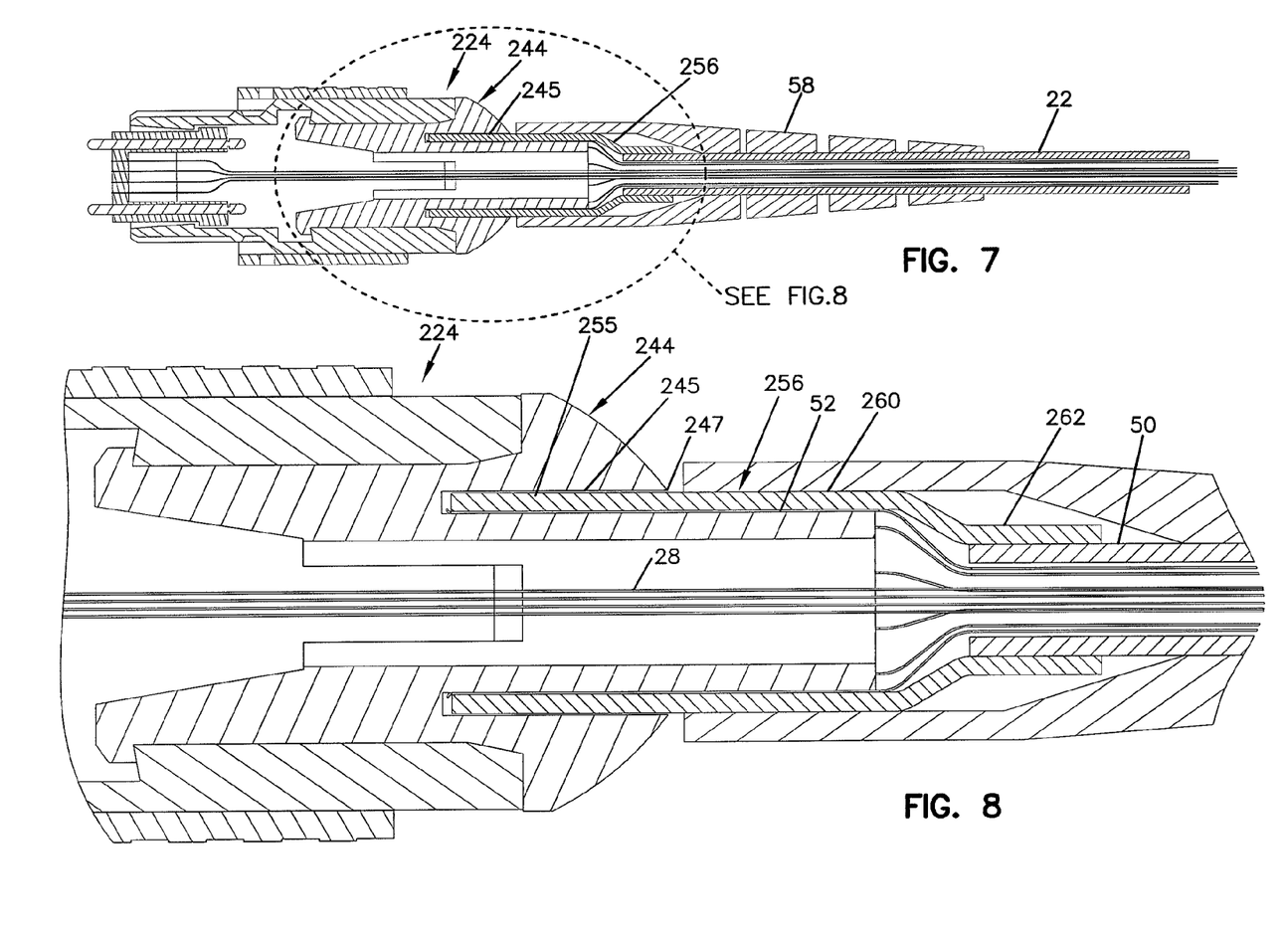
FIG. 7 is a cross-sectional view of another fiber optic cable and connector assembly in accordance with the principles of the present disclosure, the cross-sectional view taken through a pair of pins of the fiber optic cable and connector assembly.
FIG. 8 is an enlarged portion of FIG. 7.

FIGS. 7 and 8 show another fiber optic connector 224 in accordance with the principles of the present disclosure. The fiber optic connector 224 has the same components as the fiber optic connector 24 except the spring push and the crimp band have been modified. Specifically, the fiber optic connector 224 includes a spring push 244 defining an internal annular recess 245 that surrounds a central axis of the fiber optic connector 224. The recess has an open end 247 that faces proximally outwardly from the spring push 244. The recess 245 is configured to receive an extended portion 255 of a crimp band 256 such that the crimp band 256 extends into and reinforces the spring push 244 and the connector body against bending forces applied to the crimp supporting stub. The crimp band 256 also includes a first portion 260 crimped about the crimp supporting stub and a second portion 262 crimped on the outer jacket 50 of the fiber optic cable 22.

Figure 9:
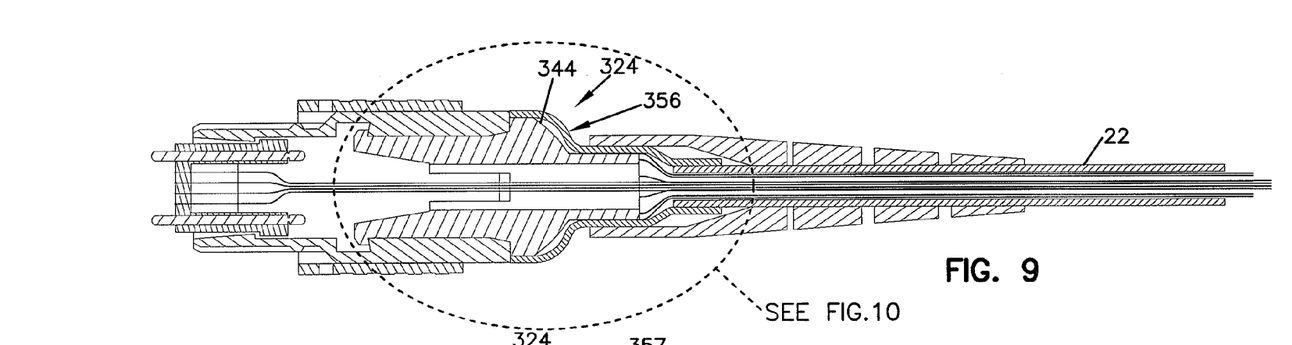
FIG. 9 is a cross-sectional view of another fiber optic cable and connector assembly in accordance with the principles of the present disclosure, the cross-sectional view taken through a pair of pins of the fiber optic cable and connector assembly.
Figure 10:
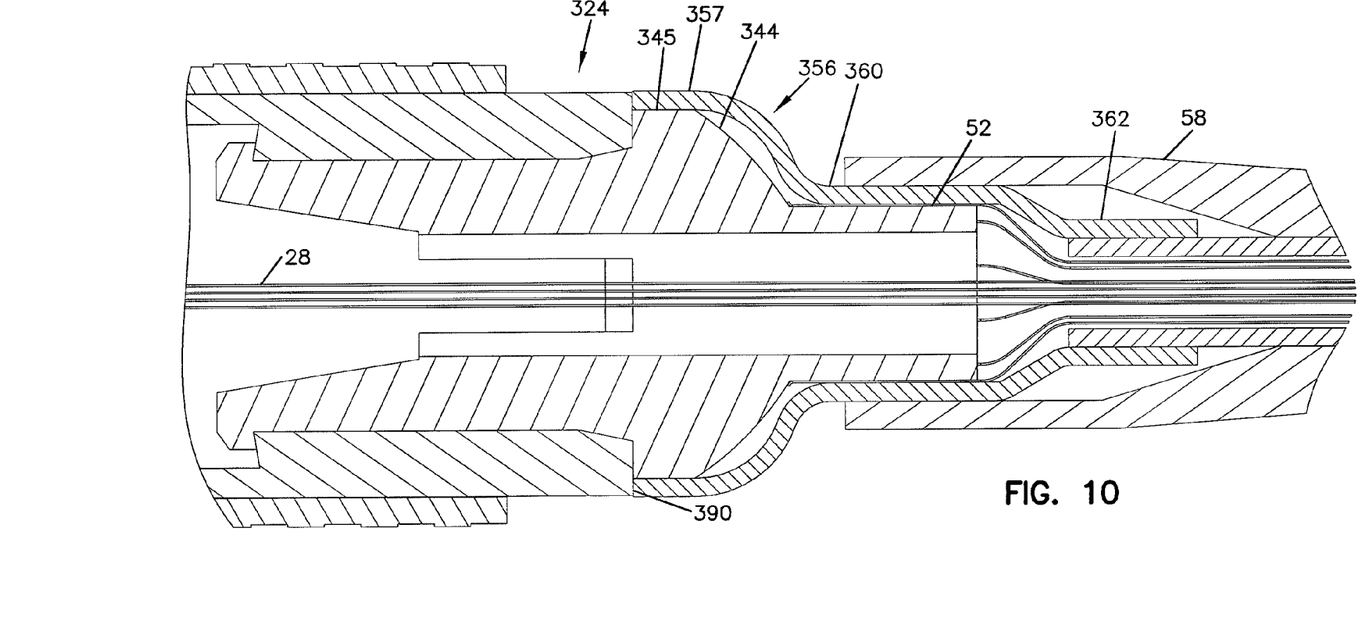
FIG. 10 is an enlarged portion of FIG. 9.

FIGS. 9 and 10 show another fiber optic connector 324 in accordance with the principles of the present disclosure. The fiber optic connector 324 has the same components as the fiber optic connector 24 except the spring push and the crimp band have been modified. Specifically, the fiber optic connector 324 includes a crimp band 356 and a spring push 344. The crimp band 356 includes an enlarged portion 357 that extends distally past the crimp supporting stub and fits over an enlarged region 345 of the spring push 344. The crimp band 356 also includes a first portion 360 crimped about the crimp supporting stub and a second portion 362 crimped on the outer jacket 50 of the fiber optic cable 22. Enlarged portion 357 of the crimp band 356 fits snugly over an enlarged portion 345 of the spring push 344 and reinforces the spring push against bending loads applied to the crimp supporting stub. The enlarged portion 345 of the spring push 344 has a smaller cross-dimension than the cross-dimension of the main body of the connector 324 such that a shoulder 390 is defined at the distal end of the spring push and the proximal end of the main body. The shoulder 390 allows the enlarged portion 357 of the crimp band 356 to be flush or almost flush with the outer surface of the main body of the fiber optic connector 324.

Figures 11, 12:
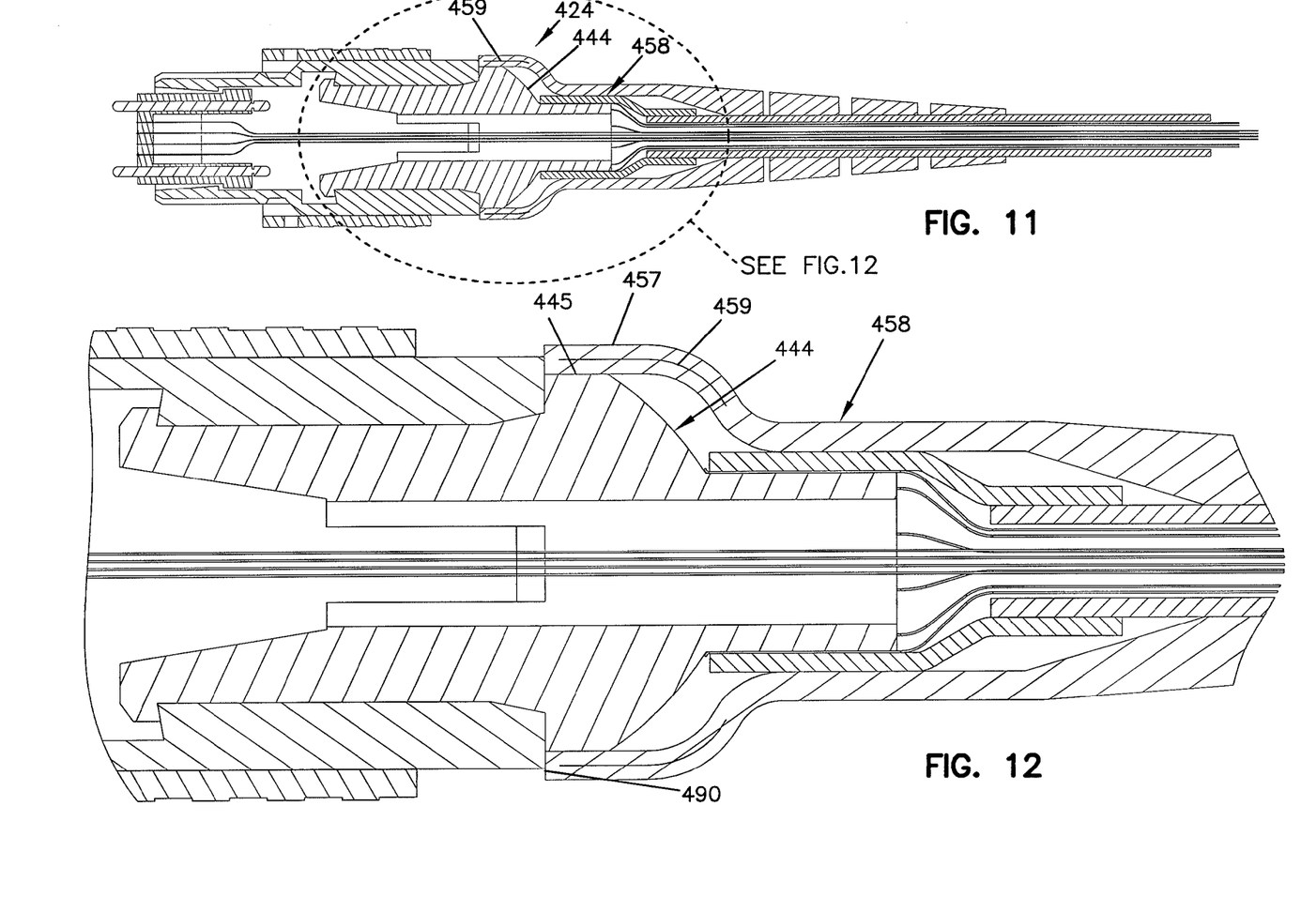
FIG. 11 is a cross-sectional view of another fiber optic cable and connector assembly in accordance with the principles of the present disclosure, the cross-sectional view taken through a pair of pins of the fiber optic cable and connector assembly.
FIG. 12 is an enlarged portion of FIG. 11.

FIGS. 11 and 12 show another fiber optic connector 424 in accordance with the principles of the present disclosure. The fiber optic connector 424 has the same components as the fiber optic connector 24 except the spring push and the boot have been modified. Specifically, the fiber optic connector 424 includes a boot 458 and a spring push 444. The boot 458 includes an enlarged portion 457 that extends distally past the crimp supporting stub and fits over an enlarged region 445 of the spring push 444. The boot 458 can include an internal reinforcing member 459 (e.g., a sleeve such as a metal sleeve). The enlarged portion 457 of the boot 458 fits snugly over an enlarged portion 445 of the spring push 444 and reinforces the spring push against bending loads applied to the crimp supporting stub. The enlarged portion 445 of the spring push 444 has a smaller cross-dimension than the cross-dimension of the main body of the connector 424 such that a shoulder 490 is defined at the distal end of the spring push and the proximal end of the main body. The shoulder 490 allows the enlarged portion 457 of the boot 458 to be flush or almost flush with the outer surface of the main body of the fiber optic connector 424.

Figure 13:
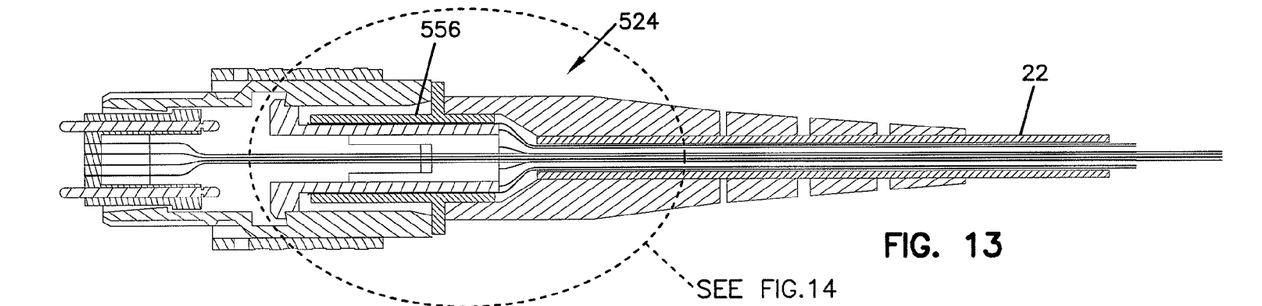
FIG. 13 is a cross-sectional view of another fiber optic cable and connector assembly in accordance with the principles of the present disclosure, the cross-sectional view taken through a pair of pins of the fiber optic cable and connector assembly.
Figure 14:
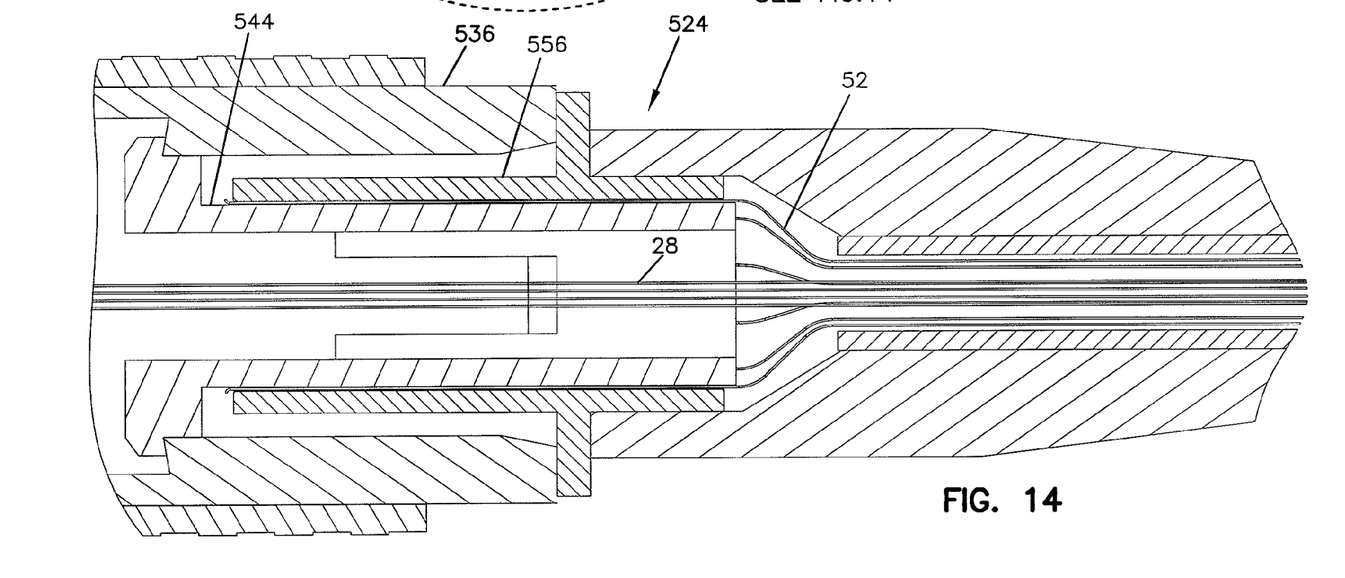
FIG. 14 is an enlarged portion of FIG. 13.

FIGS. 13 and 14 show another fiber optic connector 524 in accordance with the principles of the present disclosure. The fiber optic connector 524 has the same components as the fiber optic connector 24 except the spring push, the crimp band and the connector main body have been modified. The fiber optic connector 524 has a configuration in which a crimp band 556 is crimped over a spring push 544 and includes a crimped portion that extends inside a main connector body 536 of the fiber optic connector 524. During assembly, the strength members 52 of the fiber optic cable are initially crimped onto the spring push 544, and the spring push 544 is then snapped into the back end of the main connector body 536. In this way, the crimp band 556 can be positioned to reinforce the spring push 544 with respect to bending, and in certain embodiments the distance that the crimp supporting stub projects outwardly from the main connector body 536 can be shortened.

Figure 15:
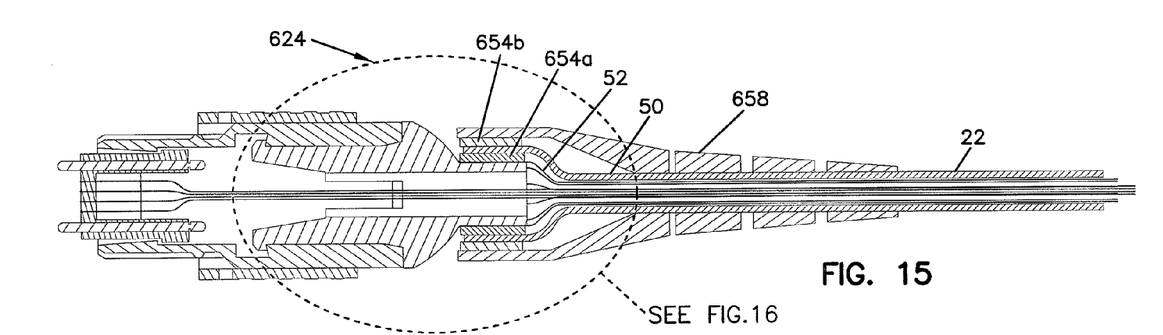
FIG. 15 is a cross-sectional view of another fiber optic cable and connector assembly in accordance with the principles of the present disclosure, the cross-sectional view taken through a pair of pins of the fiber optic cable and connector assembly.
Figure 16:
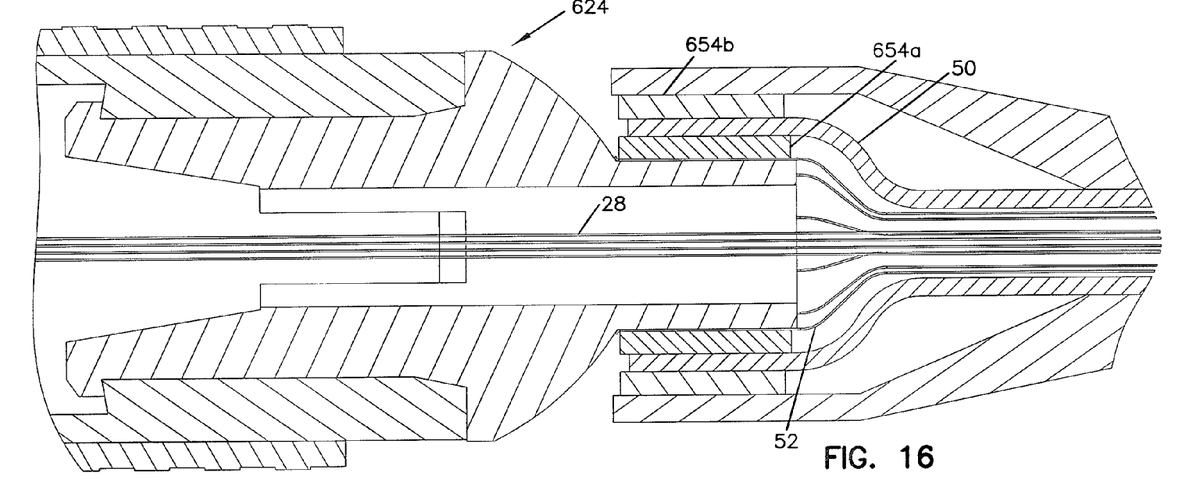
FIG. 16 is an enlarged portion of FIG. 15.

FIGS. 15 and 16 show another fiber optic connector 624 in accordance with the principles of the present disclosure. The fiber optic connector 624 has the same components as the fiber optic connector 24 except a different crimping arrangement is being used. The crimping arrangement is adapted to be shorter in a direction along the longitudinal axis of the connector 624 thereby possibly reducing a bending moment applied to the crimp supporting stub when side loading is applied to the crimp supporting stub through the fiber optic cable and the boot. The crimping arrangement includes a first crimp band 656a for crimping the strength members 52 of the fiber optic cable 22 to the crimp supporting stub to secure the strength members 52 to the connector 624. The crimping arrangement also includes a second crimp band 656b for crimping the cable jacket 50 over the first crimp band 656a to secure the outer jacket 50 to the connector 624. The connector 624 also has a shortened boot 658.

Figure 17:
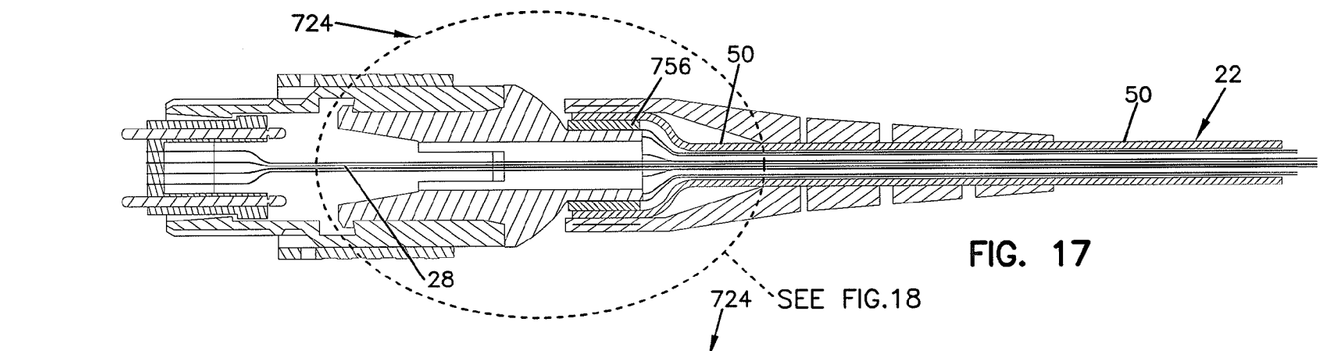
FIG. 17 is a cross-sectional view of another fiber optic cable and connector assembly in accordance with the principles of the present disclosure, the cross-sectional view taken through a pair of pins of the fiber optic cable and connector assembly.
Figure 18:
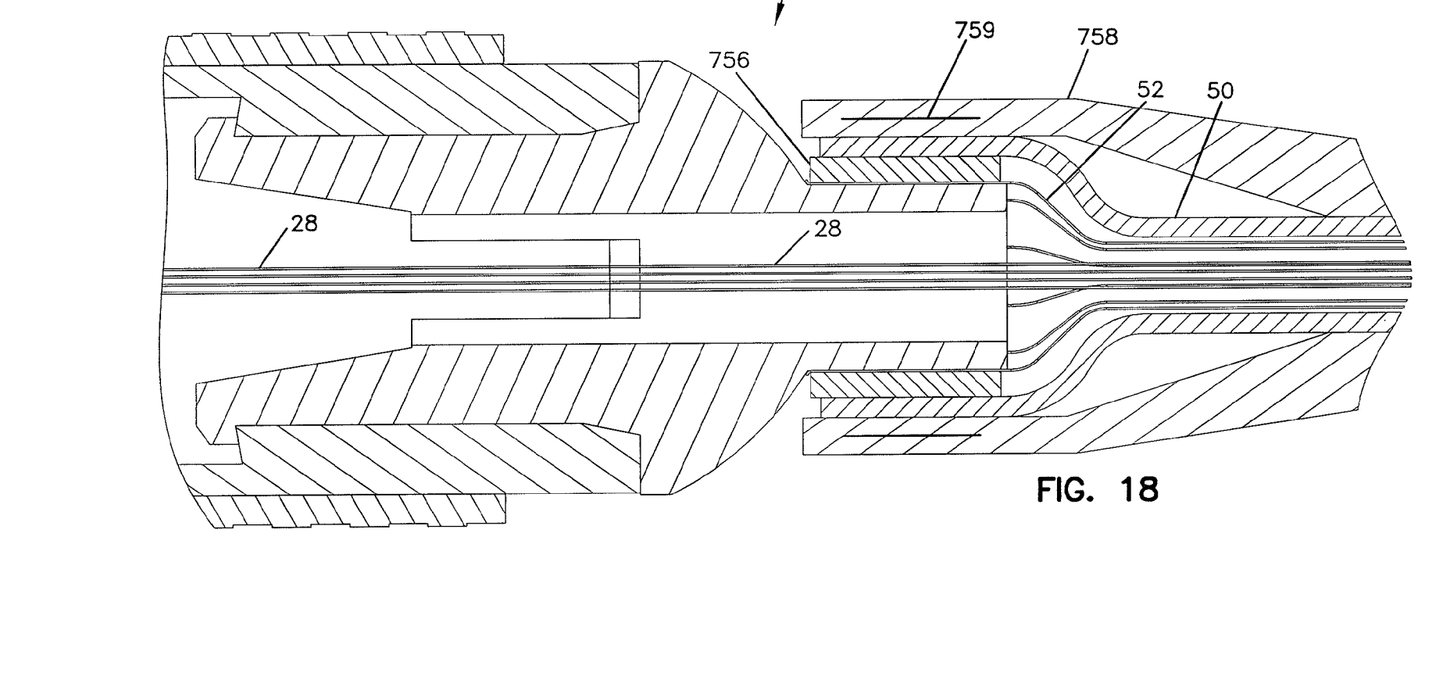
FIG. 18 is an enlarged portion of FIG. 17.

FIGS. 17 and 18 show another fiber optic connector 724 in accordance with the principles of the present disclosure. The fiber optic connector 724 has the same components as the fiber optic connector 24 except a different crimping arrangement is being used. The crimping arrangement is adapted to be shorter in a direction along the longitudinal axis of the connector 724 thereby possibly reducing a bending moment applied to the crimp supporting stub when side loading is applied to the crimp supporting stub through the fiber optic cable and the boot. The crimping arrangement includes a crimp band 756 for crimping the strength members 52 of the fiber optic cable 22 to the crimp supporting stub to secure the strength members 52 to the connector 724. The fiber optic connector 724 also includes a shortened boot 758 having an internal reinforcing member 759 such as a metal reinforcing sleeve. The boot 758 compresses the outer jacket 50 of the fiber optic cable 22 against the outer surface of the crimp band 756 to secure the outer jacket 50 to the fiber optic connector 724.

What is claimed is:

1. A fiber optic connector and cable assembly comprising:
   a fiber optic cable including at least one optical fiber, a jacket surrounding the optical fiber and at least one strength member for reinforcing the fiber optic cable;
   a fiber optic connector including a main connector body having a distal end and a proximal end, the fiber optic connector also including a ferrule supporting an end portion of the optical fiber, the ferrule being mounted at the distal end of the main connector body, the fiber optic connector further including a spring for biasing the ferrule in a distal direction and a spring push for retaining the spring within the main connector body, the spring push being mounted at the proximal end of the main connector body, the spring push including a main body and a stub that projects proximally outwardly from the main body of the spring push;
   a crimp band for securing the fiber optic cable to the fiber optic connector, the crimp band including a first portion crimped down on the stub, the strength member being secured between the first portion of the crimp band and the stub, the crimp band also including a second portion crimped down on the jacket of the fiber optic cable, the crimp band further including a radial in-step that connects the first portion of the crimp band to the second portion of the crimp band, the crimp band including an inner surface including gripping structures; and
a boot covering the crimp band and a portion of the fiber optic cable, the boot having a tapered configuration.

2. The fiber optic connector and cable assembly of claim 1, wherein the gripping structures are provided at the first portion of the crimp band and are configured to bite into the strength member.

3. The fiber optic connector and cable assembly of claim 1, wherein the gripping structures are provided at the second portion of the crimp band and are configured to engage the jacket.

4. The fiber optic connector and cable assembly of claim 1, wherein the gripping structures comprise through-holes into which portions of the jacket deform during crimping.

5. A fiber optic connector and cable assembly comprising:
a fiber optic cable including at least one optical fiber, a jacket surrounding the optical fiber and at least one strength member for reinforcing the fiber optic cable;
a fiber optic connector including a main connector body having a distal end and a proximal end, the fiber optic connector also including a ferrule supporting an end portion of the optical fiber, the ferrule being mounted at the distal end of the main connector body, the fiber optic connector further including a spring for biasing the ferrule in a distal direction and a spring push for retaining the spring within the main connector body, the spring push being mounted at the proximal end of the main connector body, the spring push including a main body and a stub that projects proximally outwardly from the main body of the spring push;
a crimp band for securing the fiber optic cable to the fiber optic connector, the crimp band crimped down on the stub, the strength member being secured between the crimp band and the stub, the crimp band including an inner surface including gripping structures that bite into the strength member; and
a boot covering the crimp band and a portion of the fiber optic cable, the boot having a tapered configuration.

6. A fiber optic connector and cable assembly comprising:
a fiber optic cable including at least one optical fiber, a jacket surrounding the optical fiber and at least one strength member for reinforcing the fiber optic cable;
a fiber optic connector;
a crimp band for securing the fiber optic cable to the fiber optic connector, the crimp band crimped down on a portion of the fiber optic connector, the strength member being secured between the crimp band and the portion of the fiber optic connector, the crimp band including an inner surface including gripping structures that bite into the strength member; and
a boot covering the crimp band and a portion of the fiber optic cable, the boot having a tapered configuration.

7. The fiber optic connector and cable assembly of claim 6:
wherein the fiber optic connector includes a main connector body having a distal end and a proximal end, the fiber optic connector also including a ferrule supporting an end portion of the at least one optical fiber, the ferrule being mounted at the distal end of the main connector body, the fiber optic connector further including a spring for biasing the ferrule in a distal direction and a spring push for retaining the spring within the main connector body, the spring push being mounted at the proximal end of the main connector body, the spring push including a main body and a stub that projects proximally outwardly from the main body of the spring push, the stub being formed by an insert having a distal end portion embedded within the main body of the spring push; and
wherein the crimp band is crimped down on the stub, the strength member being secured between the crimp band and the stub.

8. The fiber optic connector and cable assembly of claim 7, wherein the main body of the spring push is plastic and the insert is metal.

9. The fiber optic connector and cable assembly of claim 6:
wherein the fiber optic connector includes a main connector body having a distal end and a proximal end, the fiber optic connector also including a ferrule supporting an end portion of the at least one optical fiber, the ferrule being mounted at the distal end of the main connector body, the fiber optic connector further including a spring for biasing the ferrule in a distal direction and a spring push for retaining the spring within the main connector body, the spring push being mounted at the proximal end of the main connector body, the spring push including a main body and a stub that projects proximally outwardly from the main body of the spring push; and
wherein the crimp band includes a first portion crimped down on the stub, the strength member being secured between the crimp band and the stub, the crimp band also including a second portion crimped over at least a portion of the main body of the spring push.

10. The fiber optic connector and cable assembly of claim 6:
wherein the fiber optic connector includes a main connector body having a distal end and a proximal end, the fiber optic connector also including a ferrule supporting an end portion of the at least one optical fiber, the ferrule being mounted at the distal end of the main connector body, the fiber optic connector further including a spring for biasing the ferrule in a distal direction and a spring push for retaining the spring within the main connector body, the spring push being mounted at the proximal end of the main connector body, the spring push including a main body and a stub that projects proximally outwardly from the main body of the spring push; and
wherein the crimp band is crimped down on the stub, the strength member being secured between the crimp band and the stub, and the crimp band including a portion that is embedded within the spring push.

11. The fiber optic connector and cable assembly of claim 6:
wherein the fiber optic connector includes a main connector body having a distal end and a proximal end, the fiber optic connector also including a ferrule supporting an end portion of the at least one optical fiber, the ferrule being mounted at the distal end of the main connector body, the fiber optic connector further including a spring for biasing the ferrule in a distal direction and a spring push for retaining the spring within the main connector body, the spring push being mounted at the proximal end of the main connector body, the spring push including a main body and a stub that projects proximally outwardly from the main body of the spring push;
wherein the crimp band is crimped down on the stub, the strength member being secured between the crimp band and the stub; and
wherein the boot includes a first portion covering the crimp band, a second portion covering the fiber optic cable, and a third portion extending over at least a portion of the main body of the spring push, the third portion of the boot including a reinforcing element embedded therein.

12. The fiber optic connector and cable assembly of claim 6:
wherein the fiber optic connector includes a main connector body having a distal end and a proximal end, the fiber optic connector also including a ferrule supporting an end portion of the at least one optical fiber, the ferrule being mounted at the distal end of the main connector body, the fiber optic connector further including a spring for biasing the ferrule in a distal direction and a spring push for retaining the spring within the main connector body, the spring push being mounted at the proximal end of the main connector body, the spring push including a main body and a stub that projects proximally outwardly from the main body of the spring push; and
wherein the crimp band is crimped down on the stub, the strength member being secured between the crimp band and the stub, and the crimp band including a portion that extends inside the main connector body.

13. The fiber optic connector and cable assembly of claim 12, wherein the spring push is secured to the main connector body by a snap-fit connection, and wherein the strength member is crimped to the stub of the spring push prior to securing the spring push to the main connector body via the snap-fit connection.

14. The fiber optic connector and cable assembly of claim 6:
wherein the fiber optic connector includes a main connector body having a distal end and a proximal end, the fiber optic connector also including a ferrule supporting an end portion of the at least one optical fiber, the ferrule being mounted at the distal end of the main connector body, the fiber optic connector further including a spring for biasing the ferrule in a distal direction and a spring push for retaining the spring within the main connector body, the spring push being mounted at the proximal end of the main connector body, the spring push including a main body and a stub that projects proximally outwardly from the main body of the spring push;
wherein the crimp band is a first crimp band, the first crimp band being crimped down on the stub, the strength member being secured between the first crimp band and the stub, wherein the fiber optic connector and cable assembly further comprises a second crimp band crimped over the first crimp band, an end portion of the jacket of the fiber optic cable being secured between the first and second crimp bands; and
wherein the boot covers the first and second crimp bands.

15. The fiber optic connector and cable assembly of claim 6:
wherein the fiber optic connector includes a main connector body having a distal end and a proximal end, the fiber optic connector also including a ferrule supporting an end portion of the at least one optical fiber, the ferrule being mounted at the distal end of the main connector body, the fiber optic connector further including a spring for biasing the ferrule in a distal direction and a spring push for retaining the spring within the main connector body, the spring push being mounted at the proximal end of the main connector body, the spring push including a main body and a stub that projects proximally outwardly from the main body of the spring push;

wherein the crimp band is crimped down on the stub, the strength member being secured between the crimp band and the stub; and
wherein an end portion of the jacket of the fiber optic cable is secured between the boot and the crimp band.

16. The fiber optic connector and cable assembly of claim 1, wherein the crimp band is made of a deformable metal material.

17. The fiber optic connector and cable assembly of claim 1, wherein the crimp band defines a section revolved about an axis a complete revolution.

18. The fiber optic connector and cable assembly of claim 1, wherein the crimp band defines a perimeter extending completely around an interior passage.

19. The fiber optic connector and cable assembly of claim 5, wherein the crimp band is made of a deformable metal material.

20. The fiber optic connector and cable assembly of claim 5, wherein the crimp band defines a section revolved about an axis a complete revolution.

21. The fiber optic connector and cable assembly of claim 5, wherein the crimp band defines a perimeter extending completely around an interior passage.

22. The fiber optic connector and cable assembly of claim 6, wherein the crimp band is made of a deformable metal material.

23. The fiber optic connector and cable assembly of claim 6, wherein the crimp band defines a section revolved about an axis a complete revolution.

24. The fiber optic connector and cable assembly of claim 6, wherein the crimp band defines a perimeter extending completely around an interior passage.

25. A fiber optic connector and cable assembly comprising:
a fiber optic cable including at least one optical fiber, a jacket surrounding the optical fiber and at least one strength member for reinforcing the fiber optic cable;
a fiber optic connector including a crimp mandrel and a ferrule supporting an end portion of the optical fiber; and
a crimp band for securing the fiber optic cable to the fiber optic connector, the crimp band including a first portion crimped down on the crimp mandrel, the strength member being secured between the first portion of the crimp band and the crimp mandrel, the crimp band also including a second portion crimped down on the jacket of the fiber optic cable, the crimp band further including a radial in-step that connects the first portion of the crimp band to the second portion of the crimp band, the crimp band including an inner surface including gripping structures.

26. The fiber optic connector and cable assembly of claim 25, wherein the gripping structures are provided at the first portion of the crimp band and are configured to bite into the strength member.

27. The fiber optic connector and cable assembly of claim 25, wherein the gripping structures are provided at the second portion of the crimp band and are configured to engage the jacket.

28. The fiber optic connector and cable assembly of claim 25, wherein the gripping structures comprise through-holes into which portions of the jacket deform during crimping.

* * * * *